United States Patent [19]

Wells et al.

[11] 3,820,976

[45] June 28, 1974

[54] SLOW RELEASE SOIL FUMIGANTS

[75] Inventors: Wayne W. Wells; James R. Christie; Julian H. Jackson, all of Jacksonville, Fla.

[73] Assignee: Kerr-McGee Chemical Corp, Oklahoma City, Okla.

[22] Filed: Dec. 15, 1969

[21] Appl. No.: 885,342

[52] U.S. Cl.................. 71/101, 47/58, 71/DIG. 1, 424/300
[51] Int. Cl...... A01n 9/12, A01b 79/00, A01c 1/00
[58] Field of Search............ 47/58; 424/300; 71/101

[56] References Cited
UNITED STATES PATENTS

| | | | |
|---|---|---|---|
| 2,441,553 | 5/1948 | Britton | 424/81 |
| 2,766,554 | 10/1956 | Dorman et al. | 47/58 |
| 2,791,605 | 5/1957 | Dorman et al. | 260/513.5 |
| 2,916,855 | 12/1959 | Thiegs | 47/58 |

*Primary Examiner*—Shep K. Rose
*Attorney, Agent, or Firm*—William G. Addison

[57] ABSTRACT

This invention relates to a slow release soil fumigant that may be utilized in soil without the need of placing a protective cover over soil treated with such fumigant. Broadly, the invention comprises a mixture of a fumigant, a protective colloid and a humectant in water. More particularly, the invention comprises a fumigant consisting essentially of an aqueous solution of about 23 to 36 parts sodium methyl dithiocarbamate, about 60 to 67 parts water, about 1 to 4 parts protective colloid and up to 6 parts humectant.

5 Claims, No Drawings

SLOW RELEASE SOIL FUMIGANTS

This invention relates to slow release soil fumigants and particularly to a film forming soil fumigant which will release its active ingredient slowly and evenly and eliminate the need for a cover over the treated area during the fumigation period.

The use of soil fumigants to reduce nematode population and the population of certain weed forms is well known. Many soil fumigants are available and have been used in the past; however, their vapor pressure is such that it has been necessary to cover the treated area with a plastic covering in order to obtain the most effective results. This is time consuming and expensive since the plastic must be applied immediately following treatment and then removed after completion of the treatment.

The present invention provides a new slow release fumigant which eliminates the need to provide a cover over the treated area while providing equal or better fumigant effectiveness.

We have discovered that, if any of the standard soil fumigants is incorporated with a protective colloid and a stabilizer and preferably with a humectant, the resultant product will be stabilized, its effectiveness and efficiency will be markedly improved. Preferably we use as the protective colloid hydroxyethyl cellulose, sodium alginates, sodium carboxymethyl cellulose, natural gums and water soluble resins. As humectants we prefer glycols such as propylene glycol, ethylene glycol, glycerine, sorbitols and the like known humectants. Preferably we use hydroxyethyl cellulose as the protective colloid and propylene glycol as the humectant.

Soil fumigants made according to our invention using any of the well known conventional fumigants are stabilized and improved in efficiency and value. Extensive field tests have shown that greater residual effect is achieved and effectiveness is materially enhanced.

A broad formulation for use in practicing this invention would be:
- 23 to 36 parts of fumigant
- 60 to 67 parts of water
- 1 to 4 parts of protective colloid
- 0 to 6 parts of humectant A narrower and preferred range would be:
- 34 to 35.5 parts of fumigant
- 58.5 to 60 parts of water
- 1 to 2 parts of protective colloid
- 4 to 5 parts of humectant The invention may perhaps be best illustrated by reference to the following examples.

EXAMPLE I

A weed killer was prepared according to the following formula:
- 1 part of hydroxyethyl cellulose
- 4 parts of propylene glycol
- 95 parts of a solution of sodium methyl dithiocarbamate (37.2 parts of sodium methyl dithiocarbamate in 62.8 parts of water)

This formulation was applied to a field along side a standard sodium methyl dithiocarbamate fumigant treatment using a plastic soil cover. The fumigant of this invention was slightly superior in weed elimination and was much faster and more convenient to apply since it eliminated the need for a plastic cover.

EXAMPLE II

A formulation as follows:
- 2 parts of hydroxyethyl cellulose
- 4 parts of propylene glycol
- 94 parts sodium methyl dithiocarbamate solution (same as Example I)

was applied to a field as in Example I with like results.

EXAMPLE III

A formulation of 98 parts VPM soil fumigant (Du Ponts sodium methyl dithiocarbamate) and 2 parts hydroxyethyl cellulose was injected in soil alongside a warehouse in Fort Myers, Fla. where nut grass had been a constant problem at a rate of 1 pint/100 linear feet. Two weeks later no weeds were growing in treated area.

EXAMPLE IV

VPM and Vamoose (the composition of Example III) were applied to selected plots each of 2 square yards. Fifteen days later Hicks tobacco seed was planted in one square yard and three 18 inch rows of okra and three 18 inch rows of beans were planted.

The seven test plots were as follows:

| | | |
|---|---|---|
| 1. | Irrigated | VPM - 81 Gals/acre |
| 2. | Irrigated | Vamoose - 81 Gals/acre |
| 3. | Irrigated | Vamoose - 109 Gals/acre |
| 4. | Non-irrigated | VPM - 81 Gals/acre |
| 5. | Non-irrigated | Vamoose - 81 Gals/acre |
| 6. | Non-irrigated | Vamoose - 109 Gals/acre |
| 7. | Control | |

Eleven days after planting the number of nut grass plants per square foot were counted with the following results:

| | VPM-81 Gals | Vamoose - 81 Gals | Vamoose - 109 Gals | CHECK |
|---|---|---|---|---|
| Irrigated | 51 | 74 | 69 | 179 |
| Non-irrigated | 57 | 52 | 97 | 92 |
| Non-irrigated | 57 | 55 | 91 | 89 |
| Non-irrigated | 23 | 71 | 42 | 68 |
| Average | 47 | 63 | 74 | 107 |

TEST CROP STAND
Hicks tobacco, Beans, Okra. Stand counts were made at same time as follows:

| IRRIGATED | BEAN | OKRA | TOBACCO |
|---|---|---|---|
| VPM-81 Gals/A | 15,15,15 (45) | 30,26,27 (83) | Germinating |
| Vamoose 81 Gals/A | 16,17,17 (50) | 26,27,22 (75) | do. |
| Vamoose 109 Gals/A | 15,16,17 (48) | 25,26,25 (76) | do. |
| NON-IRRIGATED | | | |
| VPM-81 Gals/A | 17,17,14 (48) | 25,28,26 (79) | do. |
| Vamoose 81 Gals/A | 17,15,17 (49) | 23,26,26 (75) | do. |
| Vamoose 109 Gals/A | 14,16,13 (43) | 27,25,25 (77) | do. |
| Vamoose 109 Gals/A* | 16,16,13 (45) | 21,26,25 (72) | do. |

*Unsprayed Plots

EXAMPLE V

A sweet corn test plot was treated with various commercial soil fumigants in the recommended manner and with a product according to our invention called for purposes of this test VAMOOSE. The test data is as follows:

Corn planted 3-6-69, 1st picking 5-29-69
Treatments:
- A. - Dasanit 10G, 1 lb. act/A in row
- B. - Dasanit 10G, 2 lbs. act/A in row
- C. - EDB-40, 6 Gals/A in row
- D. - Lannate, 4 lbs. act/A incorporated
- E. - Lannate, 8 lbs. act/A incorporated
- F. - Check
- G. - VAMOOSE - 18 Gals./A in row Method of Evaluation — A representative sample 10 feet of row per plot was selected from either inner two rows. A first picking was made of all ears whose silks had turned brown.

Damage from stubby root nematodes was common on most all roots. Some fumigated rows showed late nematode damage on outer roots.

BEST ROOT DEVELOPMENT IN TREATMENTS

| South Tier | North Tier |
| --- | --- |
| Dansanit 2 lbs. | Dasanit 2 lbs. |
| Dasanit 1 lb. | Dasanit 1 lb. |
| VAMOOSE 18 Gals. | LANNATE 8 lbs. |
| LANNATE 8 lbs. | VAMOOSE 18 Gals. |
| LANNATE 4 lbs. | LANNATE 4 lbs. |
| EDB-40 6 Gals. | EDB-40 6 Gals. |
| CHECK | CHECK |

The better treatments showed more fibrous secondary roots attached to primary roots. Poorer treatments showed shortage of fibrous secondary roots.

| | South Tier Plots (1) | | | | South Middle Tier (2) | | |
| --- | --- | --- | --- | --- | --- | --- | --- |
| Treat | Wt. Lbs. | No. Ears | WORM INFEST. | Treat | Wt. Lbs. | No. Ears | WORM INFEST. |
| D | 2.75 | 6 | 100% | D | 4.75 | 8 | 100% |
| G | 5.75 | 12 | 100% | F* | 7.25 | 14 | 100% |
| C | 4.25 | 11 | 100% | C | 6.00 | 11 | 100% |
| F | 4.00 | 8 | 100% | G | 9.25 | 14 | 100% |
| B* | 3.25 | 7 | 100% | B | 5.50 | 10 | 100% |
| E | 1.25 | 5 | 100% | E | 5.75 | 10 | 90% |
| A | 4.25 | 9 | 100% | A | 6.25 | 10 | 100% |
| TOTAL | 25.50 | 58 | | TOTAL | 44.75 | 77 | |

| | North Middle Tier (3) | | | | North Tier (4) | | |
| --- | --- | --- | --- | --- | --- | --- | --- |
| Treat | Wt. Lbs. | No. Ears | WORM INFEST. | Treat | Wt. Lbs. | No. Ears | WORM INFEST. |
| G | 8.50 | 14 | 100% | B | 7.75 | 12 | 100% |
| F | 5.00 | 9 | 100% | D | 7.75 | 10 | 100% |
| D* | 3.50 | 11 | 100% | G | 8.25 | 11 | 100% |
| A | 4.25 | 12 | 92% | F | 3.50 | 9 | 100% |
| B | 3.25 | 7 | 100% | E | 5.75 | 10 | 90% |
| C | 6.75 | 11 | 100% | A* | 8.00 | 18 | 100% |
| E | 6.50 | 12 | 100% | C | 6.00 | 11 | 100% |
| TOTAL | 37.75 | 76 | | TOTAL | 47.00 | 81 | |

*Unsprayed Plots

CORN YIELD SUMMARY

| | TOTAL | | | AVERAGE | |
| --- | --- | --- | --- | --- | --- |
| TREATMENT | Lbs. Corn Per 40 Ft. | No. Ears per 40 Ft. | Lbs. Corn per 10 Ft. Plot | No. Ears per 10 Ft. Plot | % WORMS |
| G | 31.75 | 51 | 7.93 | 12.75 | 100 |
| C | 23.00 | 44 | 5.75 | 11.00 | 100 |
| A | 22.75 | 49 | 5.68 | 12.25 | 98 |
| F | 19.75 | 40 | 4.93 | 10.00 | 100 |
| B | 19.75 | 36 | 4.93 | 9.00 | 100 |
| E | 19.25 | 37 | 4.81 | 9.25 | 90 |
| D | 18.75 | 35 | 4.68 | 8.75 | 100 |

Results of 1st picking show VAMOOSE rated No. 1, EDB-40 at No. 2, Dasanit 10G (1 lbs. Act) at No. 3, Check at No. 4, Dasanit 10G (2 lb. act.) at No. 5, Lannate (8 lbs.) at No. 6, and Lannate (4 lbs.) at No. 7.

Using 5 doz. ears/crate, and 36" rows, the VAMOOSE treatment here projects to 308 crates/acre and Check treatment projects to 242 crates/acre, an increase of 66 crates/acre.

Root Growth Evaluation Corn Soil Treatments
Sanford, Florida - June 5, 1969

Representative corn plants from marked areas in plots where corn yield was obtained were used to make determinations.

One plant from each treatment in South Tier of plots and North Tier (Sutan treatment) was carefully dug, root system washed, and closely examined.

Second Picking Results - June 5, 1969
South Tier Plots (1)

| | Wt. Lbs. | No. Ears | Worm Infestation |
| --- | --- | --- | --- |
| D | .81 | 2 | 100% |
| G | .00 | 0 | — |
| C | .81 | 2 | 100% |
| F | 1.81 | 4 | 100% |
| B* | .31 | 1 | 100% |

—Continued

Second Picking Results - June 5, 1969
South Teir Plots (1)

|   | Wt. Lbs. | No. Ears | Worm Infestation |
|---|---|---|---|
| E | .00 | 0 | — |
| A | .31 | 1 | 100% |
| Total | 4.05 | 10 | |

South Middle Tier (2)

|   | Wt. Lbs. | No. Ears | Worm Infestation |
|---|---|---|---|
| D | .00 | 0 | — |
| F* | .00 | 0 | — |
| C | .37 | 1 | 100% |
| G | .00 | 0 | — |
| B | .00 | 0 | — |
| E | .75 | 2 | 100% |
| A | 2.00 | 4 | 100% |
| Total | 3.12 | 7 | |

North Middle Tier (3)

|   | Wt. Lbs. | No. Ears | Worm Infestation |
|---|---|---|---|
| G | 1.00 | 2 | 100% |
| F | .00 | 0 | — |
| D* | .00 | 0 | — |
| A | .00 | 0 | — |
| B | 1.50 | 4 | 100% |
| C | .50 | 1 | 100% |
| E | .00 | 0 | — |
| Total | 3.00 | 7 | |

North Tier (4)

|   | Wt. Lbs. | No. Ears | Worm Infestation |
|---|---|---|---|
| B | .75 | 1 | 100% |
| D | .81 | 3 | 100% |
| G | .69 | 1 | 100% |
| F | 2.00 | 4 | 100% |
| E | .75 | 2 | 100% |
| A* | .00 | 0 | — |
| C | .00 | 0 | — |
| Total | 5.00 | 11 | |

CORN YIELD SUMMARY
Second Picking

| TREATMENT per 40 Ft. | TOTAL Lbs. Corn per 40 Ft. | No. Ears per 10 Ft. | Lbs. Corn per 10 Ft. | AVERAGE No. Ears Worms | % |
|---|---|---|---|---|---|
| F | 3.81 | 8 | .95 | 2 | 100 |
| B | 2.56 | 6 | .64 | 1.5 | 100 |
| A | 2.31 | 5 | .57 | 1.2 | 100 |
| G | 1.69 | 3 | .42 | .75 | 100 |
| C | 1.68 | 4 | .42 | .75 | 100 |
| D | 1.62 | 5 | .40 | 1.25 | 100 |
| E | 1.50 | 4 | .37 | 1 | 100 |

Results of second picking showed there was only a fraction of yield as compared to the first picking.
No. 1 was check, No. 2 Dasanit 2 lbs. No. 3 Dasanit 1 lb., No. 4 was Vamoose, No. 5 was EDB-40, No. 6 Lannate 4 lbs., and No. 7 Lannate 8 lbs.

TOTAL CORN YIELD SUMMARY FIRST AND SECOND PICKING
One change occurred when yield of first and second picking were totaled. Dasanit 10G at 1 lb. moved from 3rd to 2nd place replacing EDB-40 at 6 Gal/A.

| TREATMENT | LBS. CORN 40 FT. | NO. EARS 40 FT. |
|---|---|---|
| 1st Vamoose 18 Gals. | 33.44 | 54 |
| 2nd Dasanit 1 lb. | 25.06 | 54 |
| 3rd EDB-40 6 Gals. | 24.68 | 48 |
| 4th CHECK | 23.56 | 48 |
| 5th Dasanit 2 lbs. | 22.31 | 42 |
| 6th Lannate 8 lbs. | 20.75 | 41 |
| 7th Lannate 4 lbs. | 20.37 | 40 |

The foregoing examples show the effectivenss of the soil fumigant of this invention as compared with conventional soil fumigants without the problems and expense of covering the treated area.

In the foregoing specification we have set out certain preferred compositions and practices of our invention, however, it will be understood that this invention may otherwise be practiced within the scope of the following claims.

We claim:

1. A slow release soil fumigant consisting essentially of sodium methyl dithiocarbamate about 23 to 36 parts, about 60 to 67 parts water, about 1 to 4 parts protective colloid and up to 6 parts humectant.

2. A slow release soil fumigant as claimed in claim 1 wherein the protective colloid is a member selected from the group consisting of hydroxyethyl cellulose, sodium alginates, sodium carboxymethyl cellulose, natural gums and water soluble resins.

3. A slow release soil fumigant as claimed in claim 1 wherein the humectant is a member from the group consisting of propylene glycol, ethylene glycol, glycerine and sorbitol.

4. A slow release soil fumigant as claimed in claim 1 wherein the protective colloid is hydroxyethyl cellulose and the humectant is propylene glycol.

5. A method of soil fumigation which comprises applying an aqueous solution of the composition about 23 to 36 parts sodium methyl dithiocarbamate, about 60 to 67 parts water, about 1 to 4 parts protective colloid and up to about 6 parts of humectant to the soil to be treated without a surface cover.

* * * * *

UNITED STATES PATENT OFFICE
CERTIFICATE OF CORRECTION

Patent No. 3,820,976          Dated June 28, 1974

Inventor(s) Wayne W. Wells; James R. Christie and Julian Jackson

It is certified that error appears in the above-identified patent and that said Letters Patent are hereby corrected as shown below:

Column 5, "CORN YIELD SUMMARY, Second Picking" heading should read as follows --

| TREATMENT | TOTAL | | AVERAGE | | |
|---|---|---|---|---|---|
| | Lbs. Corn per 40 Ft. | No. Ears per 40 Ft. | Lbs. Corn per 10 Ft. | No. Ears per 10 Ft. | % Worms |

Column 6, Claim 1. should read as follows --

1. A slow release soil fumigant consisting essentially of an aqueous solution of about 23 to 36 parts sodium methyl dithiocarbamate, about 60 to 67 parts water, about 1 to 4 part protective colloid and up to 6 parts humectant.

Signed and sealed this 12th day of November 1974.

(SEAL)
Attest:

McCOY M. GIBSON JR.
Attesting Officer

C. MARSHALL DANN
Commissioner of Patents